US008977659B2

(12) United States Patent
Chrin et al.

(10) Patent No.: US 8,977,659 B2
(45) Date of Patent: Mar. 10, 2015

(54) DISTRIBUTING FILES ACROSS MULTIPLE, PERMISSIBLY HETEROGENEOUS, STORAGE DEVICES

(75) Inventors: David Michael Chrin, Princeton, NJ (US); Philip Eric Jackson, Princeton Junction, NJ (US); Steven A. Orszag, Princeton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1986 days.

(21) Appl. No.: 11/842,919

(22) Filed: Aug. 21, 2007

(65) Prior Publication Data

US 2007/0288494 A1    Dec. 13, 2007

Related U.S. Application Data

(60) Division of application No. 10/832,808, filed on Apr. 27, 2004, now abandoned, which is a continuation of application No. 09/950,555, filed on Sep. 11, 2001, now Pat. No. 6,782,389.

(60) Provisional application No. 60/232,102, filed on Sep. 12, 2000.

(51) Int. Cl.
*G06F 17/30* (2006.01)
(52) U.S. Cl.
CPC ... *G06F 17/30067* (2013.01); *Y10S 707/99953* (2013.01)
USPC .................................. 707/827; 707/999.202
(58) Field of Classification Search
USPC .................................. 707/827, 966, E17.032
See application file for complete search history.

(56) References Cited

U.S. PATENT DOCUMENTS

| 4,901,231 A | 2/1990 | Bishop et al. |
| 4,901,423 A | 2/1990 | Bishop et al. |
| 5,455,953 A | 10/1995 | Russell |
| 5,513,314 A | 4/1996 | Kandasamy et al. |
| 5,727,206 A | 3/1998 | Fish et al. |
| 5,828,876 A | 10/1998 | Fish et al. |

(Continued)

OTHER PUBLICATIONS

Anderson, Thomas E. "Serverless Network File Systems" *ACM Transaction on Computer Systems*, Feb. 1996, vol. 14(1), pp. 41-79.

(Continued)

*Primary Examiner* — Christyann Pulliam
(74) *Attorney, Agent, or Firm* — Trop, Pruner & Hu, P.C.

(57) ABSTRACT

A file system (i) permits storage capacity to be added easily, (ii) can be expanded beyond a given unit, (iii) is easy to administer and manage, (iv) permits data sharing, and (v) is able to perform effectively with very large storage capacity and client loads. State information from a newly added unit is communicated (e.g., automatically and transparently) to central administration and management operations. Configuration and control information from such operations is communicated (e.g., automatically) back down to the newly added units, as well as existing units. In this way, a file system can span both local storage devices (like disk drives) and networked computational devices transparently to clients. Such state and configuration and control information can include globally managed segments as the building blocks of the file system, and a fixed mapping of globally unique file identifiers (e.g., Inode numbers) and/or ranges thereof, to such segments.

18 Claims, 10 Drawing Sheets

(56) References Cited

U.S. PATENT DOCUMENTS

| | | | |
|---|---|---|---|
| 5,873,085 A | 2/1999 | Enoki et al. | |
| 5,873,103 A | 2/1999 | Trede et al. | |
| 5,909,540 A * | 6/1999 | Carter et al. | 714/4 |
| 5,948,062 A | 9/1999 | Tzelnic et al. | |
| 5,960,446 A | 9/1999 | Schmuck et al. | |
| 5,974,424 A | 10/1999 | Schmuck et al. | |
| 5,987,506 A | 11/1999 | Carter et al. | |
| 5,991,804 A * | 11/1999 | Bolosky et al. | 709/221 |
| 6,014,669 A | 1/2000 | Slaughter | |
| 6,023,706 A | 2/2000 | Schmuck et al. | |
| 6,026,474 A | 2/2000 | Carter et al. | |
| 6,029,168 A | 2/2000 | Frey | |
| 6,061,504 A | 5/2000 | Tzelnic et al. | |
| 6,067,545 A | 5/2000 | Wolff | |
| 6,163,801 A | 12/2000 | O'Donnell et al. | |
| 6,173,293 B1 | 1/2001 | Thekkath et al. | |
| 6,182,111 B1 | 1/2001 | Inohara et al. | |
| 6,185,601 B1 | 2/2001 | Wolff | |
| 6,192,408 B1 | 2/2001 | Vahalia et al. | |
| 6,212,606 B1 | 4/2001 | Dimitroff | |
| 6,260,120 B1 | 7/2001 | Blumenau et al. | |
| 6,275,867 B1 | 8/2001 | Bendert et al. | |
| 6,301,605 B1 | 10/2001 | Napolitano et al. | |
| 6,324,581 B1 * | 11/2001 | Xu et al. | 709/229 |
| 6,330,572 B1 | 12/2001 | Sitka | |
| 6,345,244 B1 | 2/2002 | Clark | |
| 6,345,288 B1 | 2/2002 | Reed et al. | |
| 6,356,863 B1 | 3/2002 | Sayle | |
| 6,385,625 B1 | 5/2002 | Slaughter | |
| 6,389,420 B1 | 5/2002 | Vahalia et al. | |
| 6,393,485 B1 | 5/2002 | Chao et al. | |
| 6,401,126 B1 | 6/2002 | Douceur et al. | |
| 6,442,608 B1 | 8/2002 | Knight et al. | |
| 6,453,354 B1 | 9/2002 | Jiang et al. | |
| 6,457,098 B1 * | 9/2002 | DeKoning et al. | 711/114 |
| 6,493,804 B1 | 12/2002 | Soltis et al. | |
| 6,516,320 B1 * | 2/2003 | Odom et al. | 707/101 |
| 6,556,998 B1 | 4/2003 | Mukherjee et al. | |
| 6,564,228 B1 | 5/2003 | O'Connor | |
| 6,571,259 B1 | 5/2003 | Zheng et al. | |
| 6,615,223 B1 | 9/2003 | Shih et al. | |
| 6,654,912 B1 | 11/2003 | Viswanathan et al. | |
| RE38,410 E | 1/2004 | Hersch et al. | |
| 6,697,835 B1 | 2/2004 | Hanson et al. | |
| 6,697,846 B1 | 2/2004 | Soltis | |
| 6,742,035 B1 | 5/2004 | Zayas et al. | |
| 6,748,447 B1 | 6/2004 | Basani et al. | |
| 6,772,161 B2 | 8/2004 | Mahalingam et al. | |
| 6,775,703 B1 | 8/2004 | Burns et al. | |
| 6,782,389 B1 | 8/2004 | Chrin et al. | |
| 6,823,336 B1 | 11/2004 | Srinivasan et al. | |
| 6,920,580 B1 | 7/2005 | Cramer et al. | |
| 6,938,039 B1 | 8/2005 | Bober et al. | |
| 6,973,455 B1 | 12/2005 | Vahalia et al. | |
| 6,976,060 B2 | 12/2005 | Manczak et al. | |
| 7,054,910 B1 | 5/2006 | Nordin et al. | |
| 7,058,727 B2 | 6/2006 | Dingsor et al. | |
| 7,117,246 B2 | 10/2006 | Christenson et al. | |
| 7,146,377 B2 | 12/2006 | Nowicki et al. | |
| 7,162,486 B2 | 1/2007 | Patel et al. | |
| 7,203,731 B1 | 4/2007 | Coates et al. | |
| 7,406,484 B1 | 7/2008 | Srinivasan et al. | |
| 7,711,702 B2 | 5/2010 | Smolen et al. | |
| 2002/0029319 A1 | 3/2002 | Robbins et al. | |
| 2002/0059309 A1 | 5/2002 | Loy et al. | |
| 2002/0095479 A1 | 7/2002 | Schmidt | |
| 2002/0120763 A1 | 8/2002 | Miloushev et al. | |
| 2002/0138501 A1 | 9/2002 | Dake | |
| 2002/0138502 A1 | 9/2002 | Gupta | |
| 2002/0143734 A1 | 10/2002 | Loy et al. | |
| 2002/0161855 A1 | 10/2002 | Manczak et al. | |
| 2003/0004947 A1 | 1/2003 | Coverston | |
| 2003/0028587 A1 | 2/2003 | Driscoll et al. | |
| 2003/0033308 A1 | 2/2003 | Patel et al. | |
| 2003/0079222 A1 | 4/2003 | Boykin et al. | |
| 2003/0110237 A1 | 6/2003 | Kitamura et al. | |
| 2003/0115434 A1 | 6/2003 | Mahalingam et al. | |
| 2003/0115438 A1 | 6/2003 | Mahalingam et al. | |
| 2003/0135514 A1 | 7/2003 | Patel et al. | |
| 2004/0133570 A1 | 7/2004 | Soltis | |
| 2005/0027735 A1 | 2/2005 | Cabrera et al. | |
| 2007/0022117 A1 | 1/2007 | Keohane et al. | |

OTHER PUBLICATIONS

Aversa, Luis, et al. Load Balancing a Cluster of Web Servers Unsing Distributed Packet Rewriting, Boston University, pp. 1-14, Publ. 1999.
Cardellini, Valeria, et al. "Geographic Load Balancing for Scalable Distributed Web Systems" *IEEE*, pp. 20-27 2000.
Corbett, Peter F., et al. "The Vesta Parallel File System", *ACM Transactions on Computer Systems* vol. 14(3), pp. 225-264 (1996).
Grant, David, Microsoft TechNet—Web Server Clustering, Jun. 8, 2000, pp. 1-7, downloaded from the Internet at [http://www.technet.microsoft.com/en-us/library/Bb742600d(=printer).aspx] on Oct. 18, 2007.
Guan, Ping, et al. A Survey of Distributed File Systems, pp. 1-11, Pub. 1999.
Karniadakis, et al. "Nodes, Modes, and Flow Codes", *Physics Today* (Mar. 1993) pp. 34-42.
A reliable distributed file system for UNIX based on NFS Mario Magalhaes Leboute. 1996.
Data Management in a Distributed File System for Storage Area Networks. RC Burns—2000—almaden.ibm.com.
David Grant. Microsoft Tech Net Web Server Clustering. Jun. 8, 2000. Microsoft Website.
Functionality and Performance Evaluation of File Systems for Storage Area Networks (SAN) (2000). Martha Bancroft, Nick Bear, Jim Finlayson, Robert Hill, Richard Isicoff, Hoot Thompson. IEEE Symposium on Mass Storage Systems.
Goldick, Jonathan S., et al., Multi-resident AFS: An Adventure in Mass Storage, In Proceedings of the 1995 USENIX Technical Conference, pp. 47-58, Jan. 1995.
Ji et al., Design and Implementation Of An Island-Based File System, Dept. of Computer Science, Princeton University, 1999, 27 pps.
Karamanolis et al. DiFFS: a Scalable Distributed File System, HP Laboratories Palo Alto, Jan. 24, 2001, 8 pps.
Levy and Silberschatz (1990) ACM Computing Surveys 22:321-373.
Ligon, III, Walter, et al. "An Overview of the Parallel Virtual File System", Proceedings of the 1999 Extreme Linux Workshop (1999) pp. 1-8.
Luis Averse et al. Load Balancing a Cluster of Web Servers Using Distributed Packet Rewriting. Pub. 1999.
Morris, et al. (1986) Communications of the ACM29:184-201.
NASD Scalable Storage Systems. Garth A. Gibson. et al. Appears in the Proceedings of USENIX 1999, Linux Workshop, Monterey, CA, Jun. 9-11, 1999.
Peter F. Corbett et al. The Vesta Parallel File System. ACM Aug. 1996.
Ping Guan et al. A Survey of Distributed File Systems. Pub. 1999.
Strategic directions in storage I/O issues in large-scale computing. ACM Portal 1996. By Garth Gibson.
Thekkath et al., Frangipani: A Scalable Distributed File System, SOSP '97 Proceeding: of the Sixteenth ACM Symposium on Operating Systems Principles, 1997, pp. 224-237.
Thomas E. Anderson et al. Serverless Network File Systems. ACM Feb. 1996.
Valeria Cardellini et al. Geographic load balancing for scalable distributed Web systems. IEEE 2000.
Zhang et al., Designing a Robust Namespace for Distributed File Services, IEEE, Oct. 28-31, 2001, 10 pps.
Gibson, "Strategic directions in storage 1/0 issues in Large Scale Computing." ACM Portal 1996.

* cited by examiner

SEGMENT # TO FILE SERVER (e.g., IP) ADDRESS MAP — 410

| SEGMENT NUMBER RANGE | MASK | (PARTIAL) SERVER LOCATION |
|---|---|---|
| (412) | (414) | (416) |
| ... | ... | ... |

420

| SEGMENT # | MASK | (PARTIAL) SERVER LOCATION |
|---|---|---|
| (422) | | |

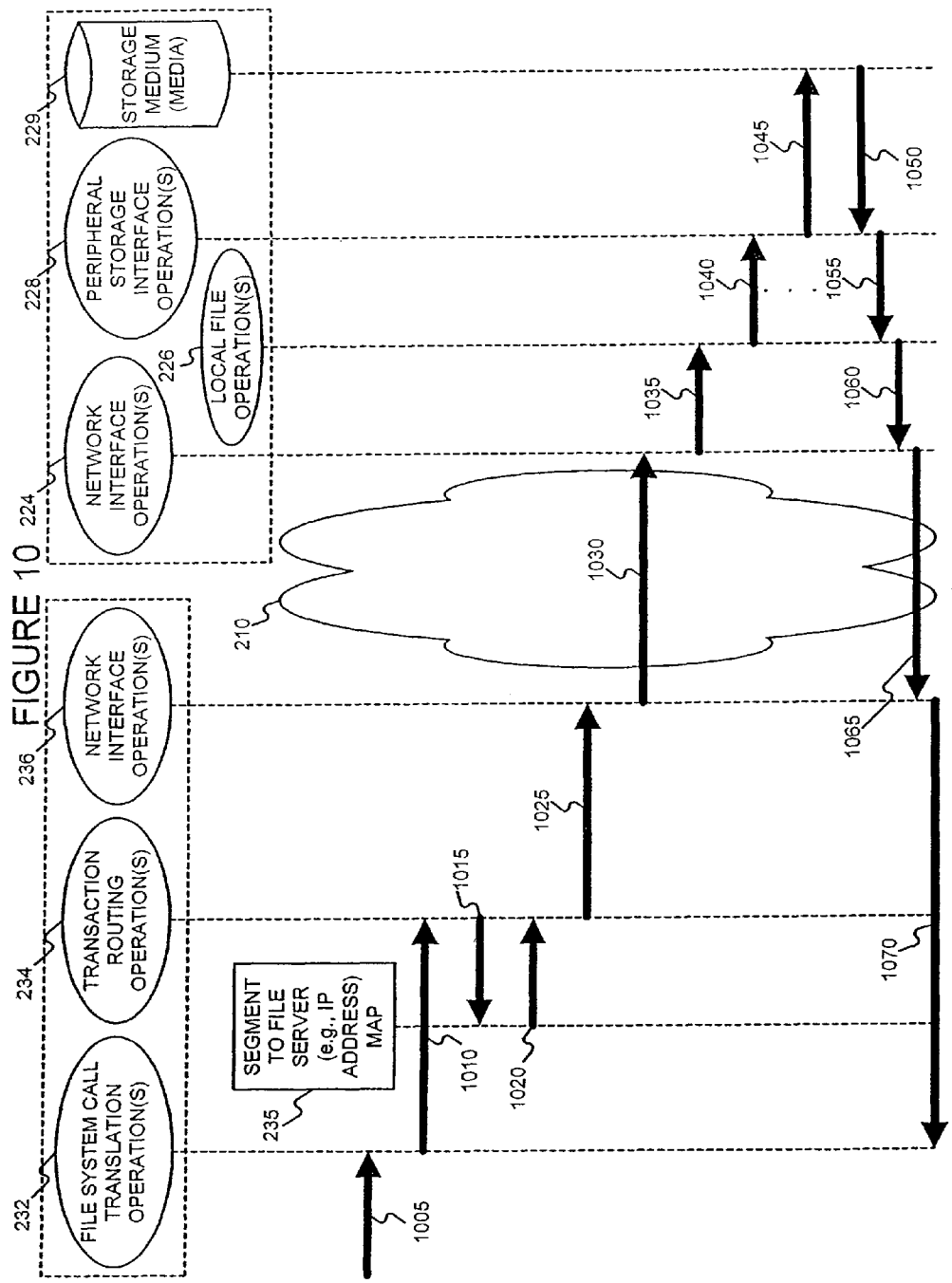

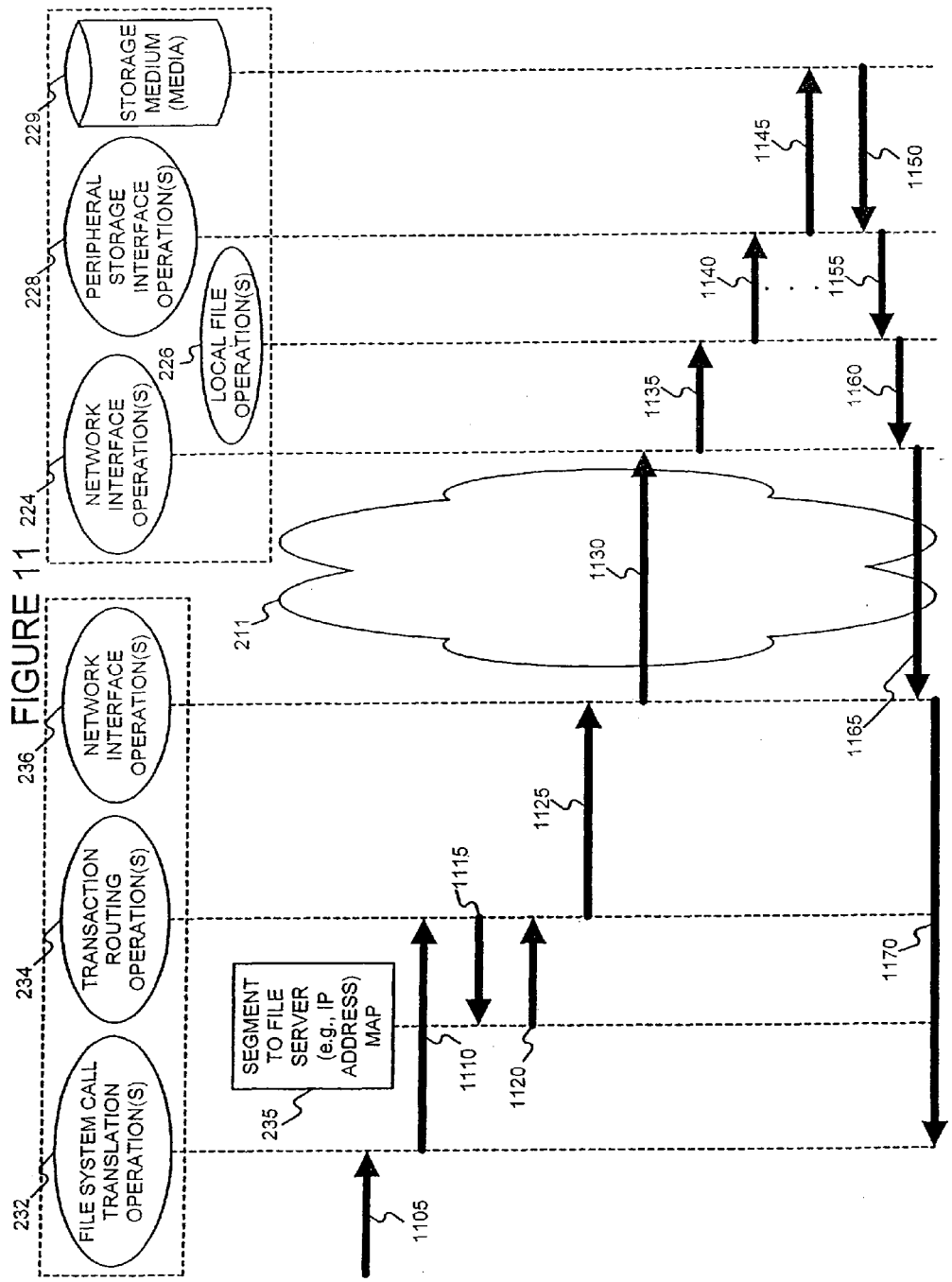

DISTRIBUTING FILES ACROSS MULTIPLE, PERMISSIBLY HETEROGENEOUS, STORAGE DEVICES

§0. RELATED APPLICATIONS

This application is a divisional patent application of U.S. patent application Ser. No. 10/832,808, filed Apr. 27, 2004, which is a continuation of U.S. patent application Ser. No. 09/950,555 filed Sep. 11, 2001 which claims benefit of U.S. patent application Ser. No. 60/232,102, filed Sep. 12, 2000, which are herein incorporated by reference in their entirety for all purposes.

§1. BACKGROUND OF THE INVENTION

§1.1 Field of the Invention

The present invention concerns computer storage and file systems. More specifically, the present invention concerns techniques for managing and using a distributed storage system.

§1.2 Related Art

Data generated by, and for use by, computers is stored in file systems. The design of file systems has evolved in the last two decades, basically from a server-centric model (which can be thought of as a local file system), to a storage-centric model (which can be thought of as a networked file system).

Stand alone personal computers exemplify a server-centric model—storage has resided on the personal computer itself, initially using hard disk storage, and more recently, optical storage. As local area networks ("LANs") became popular, networked computers could store and share data on a so-called file server on the LAN. Storage associated with a given file server is commonly referred to as server attached storage ("SAS"). Storage could be increased by adding disk space to a file server. Unfortunately, however, SASs are only expandable internally—there is no transparent data sharing between file servers. Further, with SASs, throughput is limited by the speed of the fixed number of busses internal to the file server. Accordingly, SASs also exemplify a server-centric model.

As networks became more common, and as network speed and reliability increased, network attached storage ("NAS") has become popular. NASs are easy to install and each NAS, individually, is relatively easy to maintain. In a NAS, a file system on the server is accessible from a client via a network file system protocol like NFS or CIFS. Network file systems like NFS and CIFS are layered protocols that allow a client to request a particular file from a pre-designated server. The client's operating system translates a file access request to the NFS or DFS format and forwards it to the server. The server processes the request and in turn translates it to a local file system call that accesses the information on magnetic disks or other storage media. The disadvantage of this technology is that a file system cannot expand beyond the limits of single NAS machine. Consequently, administering and maintaining more than a few NAS units, and consequently more than a few file systems, becomes difficult. Thus, in this regard, NASs can be thought of as a server-centric file system model.

Storage area networks (SANs) (and clustered file systems) exemplify a storage-centric file system model. SANs provide a simple technology for managing a cluster or group of disk-storage units, effectively pooling such units. SANs use a front-end system, which can be a NAS or a traditional server. SANs are (i) easy to expand, (ii) permit centralized management and administration of the pool of disk storage units, and (iii) allow the pool of disk storage units to be shared among a set of front-end server system. Moreover, SANs enable various data protection/availability functions such as multi-unit mirroring with failover for example. Unfortunately, however, SANs are expensive. Although they permit space to be shared among front-end server systems, they don't permit multiple SANs environments to use the same file system. Thus, although SANs pool storage, they basically behave as a server-centric file system. That is, like a fancy (e.g., with advanced data protection and availability functions) disk drive on a system. Finally, various incompatible versions of SANs have emerged.

The article, T. E. Anderson et al., "Serverless Network File Systems," *Proc. 15th ACM Symposium on Operating System Principles*, pp. 109-126 (1995) (hereafter referred to as "the Berkeley paper") discusses a data-centric distributed file system. In the system, manager maps, which map a file to a manager for controlling the file, are globally managed and maintained. Unfortunately, the present inventors believe that maintaining and storing a map having every file could limit scalability of the system as the number of files become large.

§1.3 Unmet Needs

In view of the foregoing disadvantages of known storage technologies, such as the server-centric and storage-centric models described above, there is a need for a new storage technology that (i) permits storage capacity to be added easily (as is the case with NASs), (ii) that permits file systems to be expanded beyond a given unit (as is the case with SANs), (iii) that are easy to administer and manage, (iv) that permit data sharing, (v) and are able to perform effectively with very large storage capacity and client loads.

§2. SUMMARY OF THE INVENTION

The present invention may provide methods, apparatus and data structures for providing a file system which meets the needs listed in §1.3. A distributed file system in which files are distributed across more than one file server and in which each file server has physical storage media may be provided. The present invention can determine a particular file server to which a file system call pertains by (a) accepting a file system call including a file identifier, (b) determining a contiguous unit of the physical storage media of the file servers of the distributed file system based on the file identifier, (c) determining the file server having the physical storage media that contains the determined contiguous unit, and (d) forwarding a request, based on the file system call accepted, to the file server determined to have the physical storage media that contains the determined contiguous unit.

The file identifier may be an Inode number and the contiguous unit may be a segment. The file server having the physical storage media that contains the determined contiguous unit may be determined by a table, administered globally across the file system, that maps the contiguous unit to (the (e.g., IP) address of) the file server.

§3. BRIEF DESCRIPTION OF THE DRAWINGS

FIG. 4 is a block diagram of an exemplary table data structure that may be used to map segment numbers to an identifier (e.g., an address) of a file server storing the segment.

FIG. 10 is a messaging diagram that illustrates a read operation in an exemplary embodiment of the present invention.

FIG. 11 is a messaging diagram that illustrates a write operation in an exemplary embodiment of the present invention.

§4. DETAILED DESCRIPTION

The present invention involves novel methods, apparatus and data structures for providing advanced data storage. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regards their invention as the following disclosed methods, apparatus, articles of manufacturers, and data structures and any other patentable subject matter to the extent that they are patentable.

In the following, environments in which the present invention may be employed are introduced in §4.1. Then, functions that may be performed by the present invention are introduced in §4.2. Then, operations, data structures, methods and apparatus that may be used to effect those functions are described in §4.3. Thereafter, examples of how exemplary parts of the present invention may operate is described in §4.4. Finally, some conclusions about the present invention are set forth in §4.5.

§4.1 Exemplary Environments in which Invention May Operate

The following exemplary environments are presented to illustrate examples of utility of the present invention and to illustrate examples of contexts in which the present invention may operate. However, the present invention can be used in other environments and its use is not intended to be limited to the exemplary environment.

Figure 1:
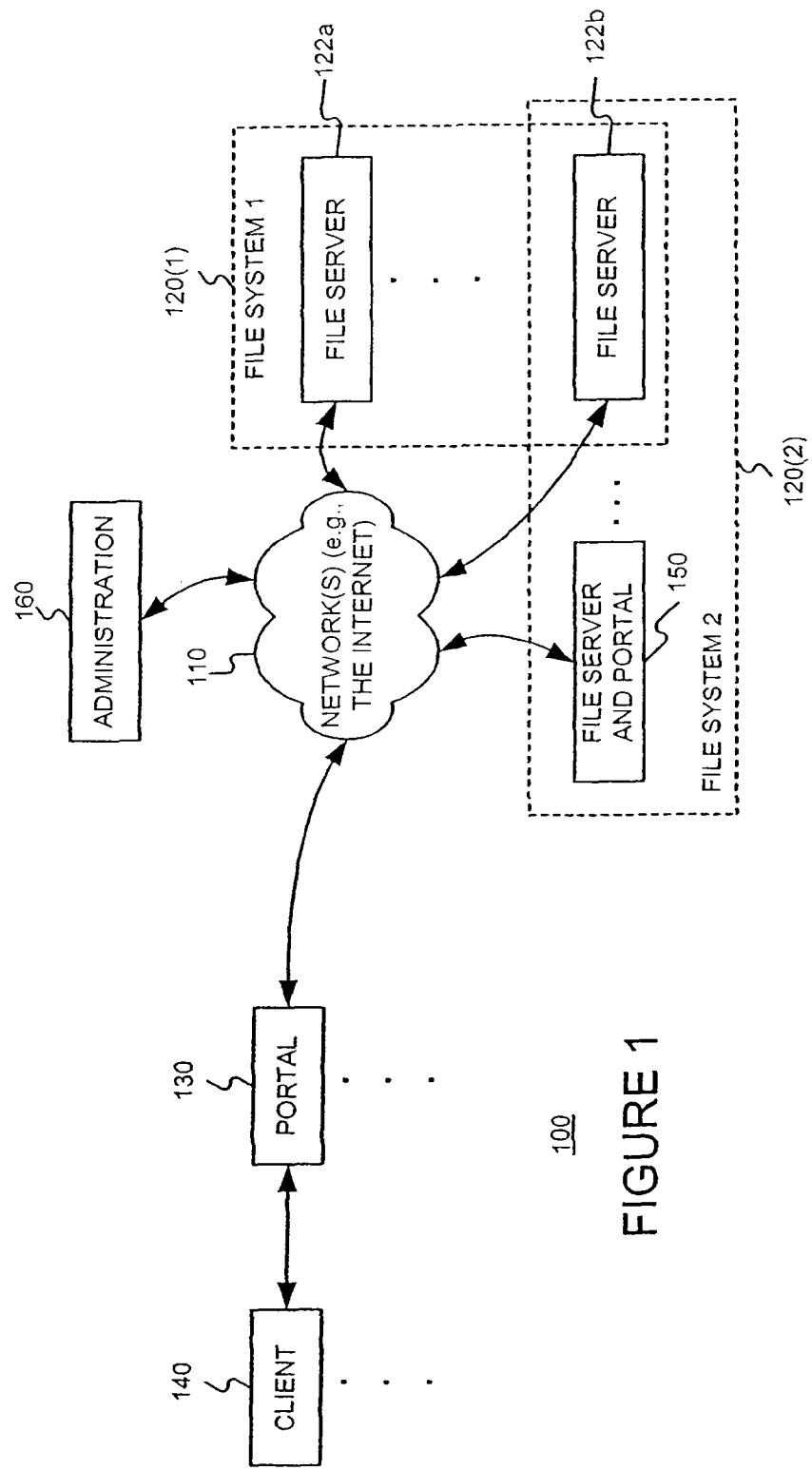
FIG. 1 is a block diagram of an exemplary environment in which various aspects of the present invention may take place.

FIG. 1 is a block diagram of an environment 100 in which the present invention may be used. Various components are coupled with (i.e., can communicate with) a network(s) 110, such as an Internet protocol ("IP") based network. A file system 120(1), 120(2) may include one or more file servers 122. One or more portal units 130 permit one or more clients 140 to use the file system(s). The clients 140 needn't be provided with any special front-end software or application. From the perspective of a client 140, the file system 120(1), 120(2) is a virtual single storage device residing on the portal. Combined file server and portal units 150 are possible. Administration 160 of the file servers and portals may be centralized. Administrative information may be collected from the units 122, 130, 150 and distributed to such units 122, 130, 150 in a point-to-point or hierarchical manner. As shown, the environment 100 can support multiple file systems 120(1), 120(2) if desired. As illustrated, a single file server 122b may belong to/support more than one file system.

§4.2 Functions That May be Performed by the Present Invention

The present invention may function to (i) permit storage capacity to be added easily (as is the case with NASs), (ii) to permit file systems to be expanded beyond a given unit (as is the case with SANs), (iii) provide a file system that is easy to administer and manage, (iv) permit data sharing, and (v) provide all this functionality in a way that remains efficient at very large capacities and client loads. The present invention may do so by (e.g., automatically) disseminating (e.g., state) information from a newly added unit to central administration and management operations, and by (e.g., automatically) disseminating (e.g., configuration and control) information from such operations back down to the newly added units, as well as existing units. In this way, a file system can span both local storage devices (like disk drives) and networked computational devices transparently to clients. Such state and configuration and control information can include globally managed segments as the building blocks of the file system, and a fixed mapping of globally unique file identifiers (e.g., Inode numbers) and/or ranges thereof, to such segments.

Having introduced functions that may be performed by the present invention, exemplary operations, data structures, methods and apparatus for effecting these functions are described in §4.3 below.

§4.3 Exemplary Operations, Data Structures, Methods and Apparatus for Effecting Functions That May be Performed by the Present Invention In the following, exemplary operations that may be performed by the present invention, and exemplary data structures that may be used by the present invention, are introduced in §4.3.1 with reference to FIGS. 2-4. Then, exemplary methods for effecting such operations are described in §4.3.2 with reference to FIGS. 5-8. Finally, exemplary apparatus that may be used to effect the exemplary processes and store the exemplary data structures are described in §4.3.3 with reference to FIG. 9.

§4.3.1 Exemplary Operations and Data Structures

Figure 2:
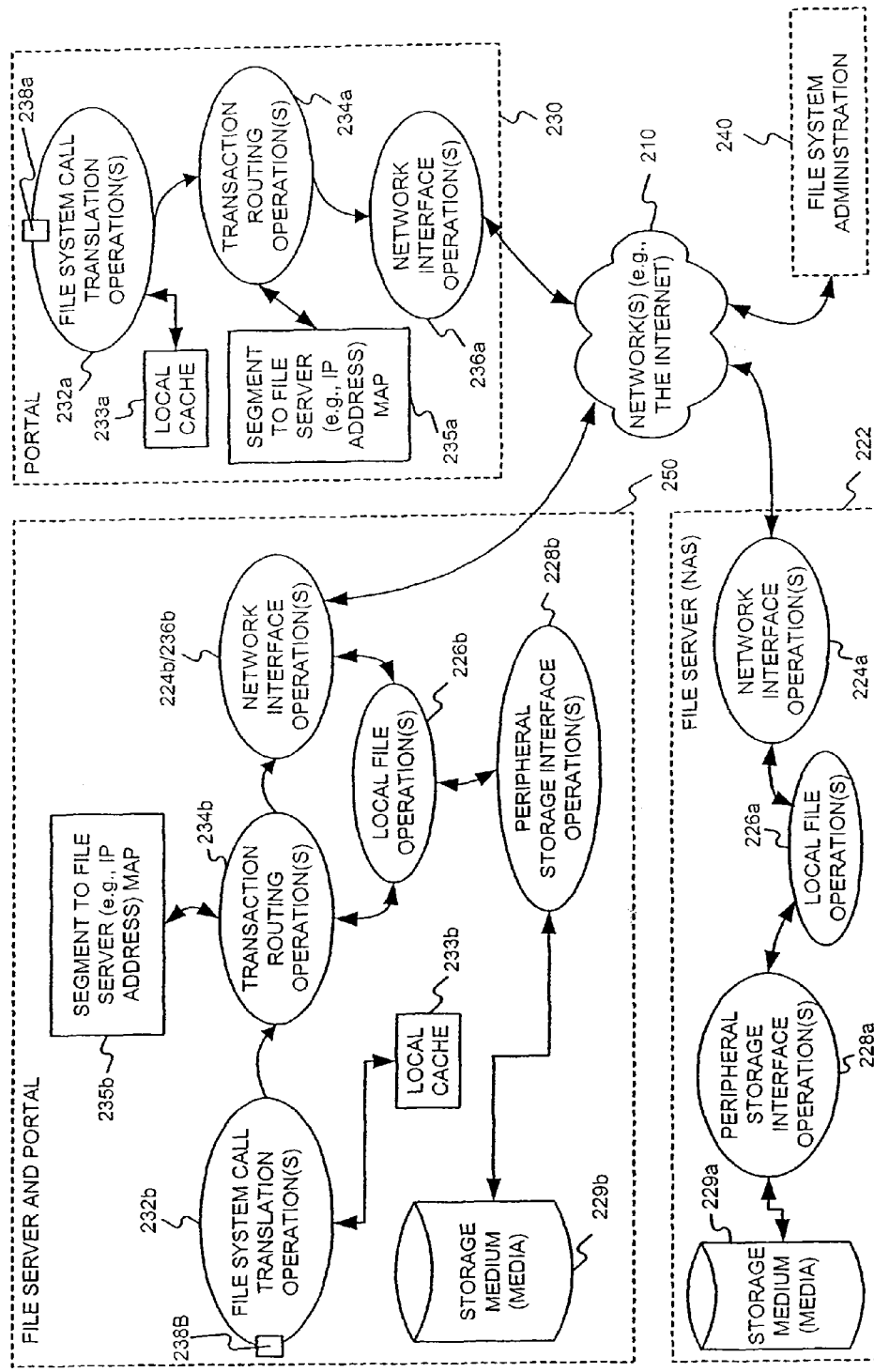
FIG. 2 is a process bubble diagram of operations that may be carried out by various exemplary apparatus used in the environment of FIG. 1.

FIG. 2 is a process bubble diagram of operations that may be carried out by various exemplary apparatus used in the environment of FIG. 1. The apparatus include a portal 230, a file server 222, and/or a combined file server and portal 250. Each of these units may be coupled with one or more networks 210 that facilitate communications among the units. One or more file system administration units 240 may be used to gather information about units added to a file system, and disseminate system control information to all of the units (e.g., supporting portal functions) of a file system. Such information gathering and dissemination may take place over the network(s) 210, or some other network.

Referring first to the file server 222, the local file operation(s) 226a represents the typical core functionality of a file system including reading and writing files, inserting and deleting directory entries, locking, etc. The details of the implementation of this file system are not important outside of the characteristics and behavior specified here. The local file operation(s) 226a translates given requests into input/ output ("I/O") requests that are then submitted to a peripheral storage interface operation(s) 228a. The peripheral storage interface operation(s) 228a processes all the I/O requests to the local storage sub-system 229a. The storage sub-system 229a can be used to store data such as files. The peripheral storage interface operation(s) 228a may be used to provide data transfer capability, error recovery and status updates. The peripheral storage interface operation(s) 228a may involve any type of protocol for communication with the storage sub-system 229a, such as a network protocol for example. File operation requests access the local file operation(s) 226a, and responses to such requests are provided to the network(s) 210, via network interface operation(s) 224a.

Referring now to the portal 230, a client (user) can access the file system of the present invention via an access point 238a in a file system call translation operation(s). One way for this entry is through a system call, which will typically be operating system specific and file system related. The file system call translation operation(s) 232a can be used to convert a file system request to one or more atomic file operations, where an atomic file operation accesses or modifies only one file object. Such atomic file operations may be expressed as commands contained in a transaction object. If the system call includes a file identifier (e.g., an Inode number), the file system call translation operation(s) 232a may also be used to determine a physical part of a storage medium of the file system corresponding to the transaction (e.g., a segment number) from a (globally) unique file identifier (e.g., Inode number). The file system call translation operation(s) 232a may include a single stage or multiple stages. This file system call translation operations may also contain local cache 233a. This local cache 233a may include a local data cache, a cache of file locks and other information that may be frequently needed by a client, or by a program servicing a client. If a request cannot be satisfied using local cache 233a, the file system translation operation(s) 232a may forward the transaction object containing atomic file operation commands to the transaction routing operation(s) 234a.

The transaction routing operation(s) 234b uses the (globally) unique file identifier (e.g., Inode number) associated with each atomic file operation command, or the physical part of file system (e.g., the segment number) derived there from, to determine the location (e.g., the IP address) of a file server 222/250 that is in charge of the uniquely identified file. This file server can be local (i.e., a unit acting as both a portal and a file server, that received the request) or remote. If this file server is local, the transaction routing operation(s) 234b simply passes the file operation to the local file operation(s) 226b which, in turn, passes an appropriate command(s) to the peripheral storage interface operation(s) 228b for accessing the storage medium 229b. If, on the other hand, the file server is remote, the network(s) 210 is used to communicate this operation. The system is independent of any particular networking hardware, protocols or software. All networking requests are handed over to a network interface operation(s) 236b.

The network interface operation(s) 224/236 services networking requests regardless of the underlying hardware or protocol, and is used to forward the transaction towards the appropriate file server 222. The network interface operation(s) 224/236 may provide data transfer, error recovery and status updates on the network(s) 210.

Figure 3:
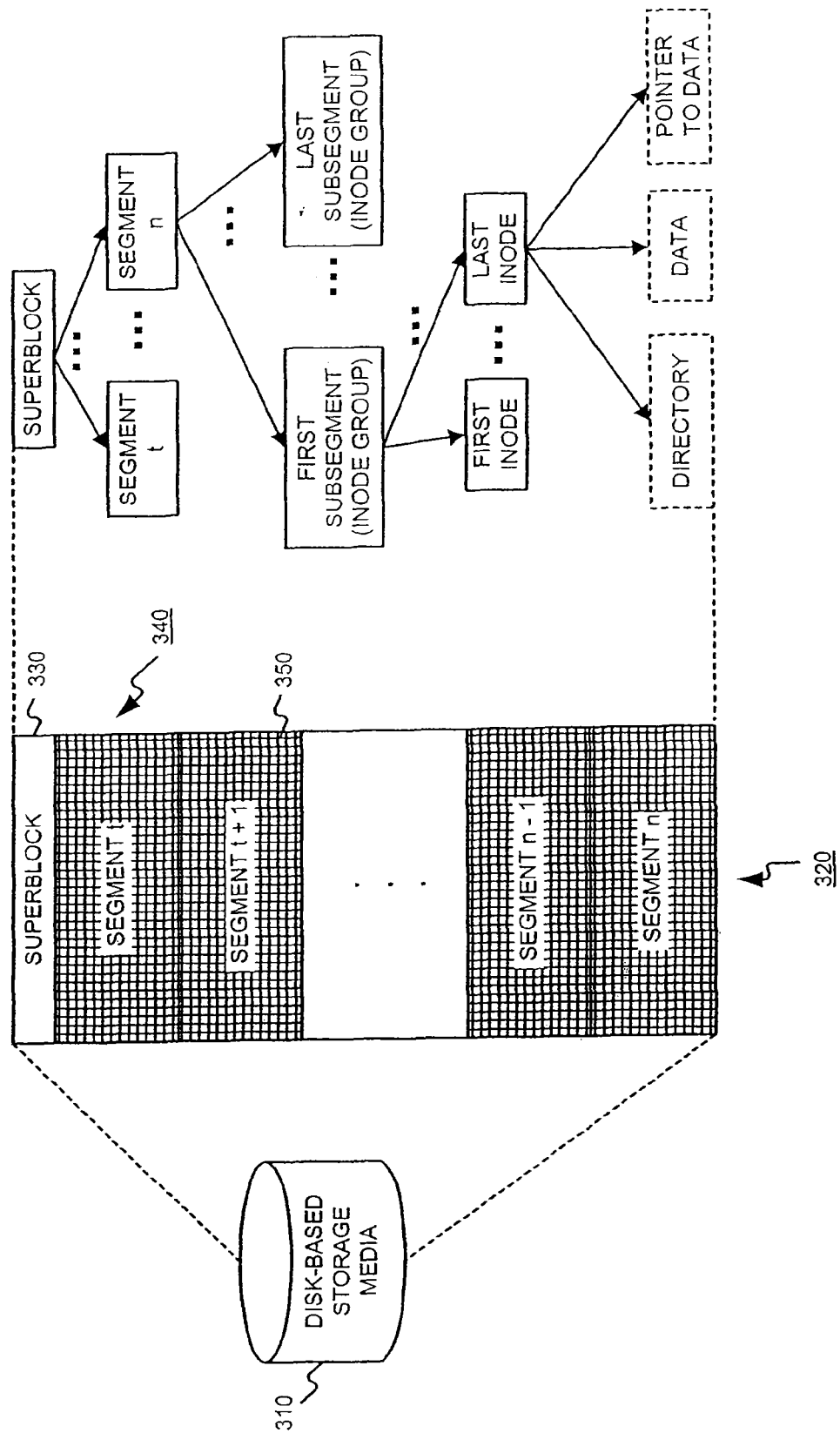
FIG. 3 is a block diagram of an exemplary data structure of a storage medium, such as a disk-based storage medium.

Referring now to FIG. 3, rather than using a disk (or some other discrete storage unit or medium) 310 as a fundamental unit of a file system, an exemplary embodiment of the present invention employs a smaller unit, referred to as a "segment" 340. A segment 340 is a contiguous range of disk (or other storage medium) memory with a predetermined maximum size (e.g., 64 gigabytes ("GB") in one exemplary embodiment). The actual target size for a segment is configurable. In one exemplary embodiment, the target size is four (4) GB. In such an embodiment, a typical single disk drive with a capacity of, for example, 50 GB, would contain between one and a dozen segments. The actual sizes of segments can vary from disk (or other storage medium) to disk (or other storage medium).

To determine what each disk (or some other storage medium) contains, a superblock 330 is added at a fixed address. This superblock 330 contains a map of all the segments 340 residing on this disk (or some other storage medium). Such a map may list the blocks 350 where the segments start. The superblock 330 may also associate the file system(s) with the segments that belong to the file system. The superblock may be duplicated for fault-tolerance either on the same disk (or some other storage medium) or a different one.

In the file system of the present invention, a file or Inode stored on a disk (or some other storage media) may be addressed by (i) a segment number, and (ii) a block number within the segment. The translation of this address to a physical disk address need only occur only at (or by) the lowest level, by the peripheral storage interface operation(s) (e.g., thread) 228 of the appropriate file server 222/250. None of the basic file system functionality needs to know anything about which disk (or other storage medium) the segment resides on, or whether or not two segments are on the same physical hardware. That is, the client and file system calls from the client don't need to know anything about which disk (or other storage medium) a segment is on (or even the segment for that matter). Neither, in fact, do the local file operations 226 need to know anything about the disk (or other storage medium) that a given segment resides on.

In accordance with the present invention, within a file system, each (globally) unique file identifier ("FID") (e.g., an Inode number) is associated with a single controlling segment, though each segment can have more than one associated FID (e.g., Inode number). The FIDs (e.g., Inode numbers) can be associated with their segments in a simple fixed manner. For example, in an exemplary embodiment of the present invention, any segment has a fixed number of Inode numbers that it potentially can (i.e., may) store.

For example, for a maximum segment size of 64 GB, the fixed number of Inodes per segment may be 8,388,608 (this number comes from dividing the 64 GB maximum segment size by an average file size of 8 KB). In this exemplary embodiment, the segment number can be used to determine the actual ranges of Inode numbers controlled by a segment in the file system. For example, the first segment (number 0) of a file system would have Inode numbers 0 through 8,388,607. The second segment would have Inode numbers 8,388,608 through 16,777,215, and so on. The root Inode (directory) of a file system is assigned the number 1 by convention (Inode 0 is not used) and, of course, resides on the first segment. Note that the foregoing numbers represent the maximum ranges of Inodes that a given segment may control—the actual numbers of Inodes that have been allocated will generally be much smaller.

An Inode in the present invention may have essentially the same properties as that of a traditional file system Inode. A number uniquely identifies the Inode, which in an exemplary embodiment is a 64-bit quantity. The Inode may contain key information about a file or directory such as type, length, access and modification times, length, location on disk, owner, permissions, link-count, etc. It may also contain additional information specific to the particular file system.

On disk (or other storage medium), Inodes may be maintained in Inode blocks (or groups). The Inode blocks themselves may be quite simple. In one exemplary implementation, they simply include a bitmap showing which Inodes in the block are free, a count of free Inodes, and the array of Inodes themselves, as many as fit in the block.

As noted above, each segment of the file system is responsible for a fixed set of Inode numbers. This principle is repeated within the segment—that is, segments may be of varying size, but they are always made up of some multiple of the smallest file system unit, namely the Subsegment. Within the segment, each Subsegment is again responsible for a fixed subset of the Inodes in the segment.

The data-centric nature of the file system of the present invention, and the advantages of such a data-centric file system can be appreciated from the fact that essentially every operation that can be performed on a file system is associated with some single (globally) unique FID (e.g., Inode number). In the exemplary embodiment, to determine where that file is stored, and hence where the operation needs to be performed, simply dividing the Inode number by the constant 8,388,608 yields the segment number. (If the result is not a whole number, it is truncated to the next lower whole number. For example, if the Inode number divided by the constant was 1.983, the segment number would be 1.)

This convention also makes it simple to distribute the file system over multiple servers as well—all that is needed is a map of which segments of the file system reside on which host file server. More specifically, once the segment number is derived from the Inode number, the appropriate file server can be determined by mapping, such as a routing table. In the simplest case, this map is simply a table that lists the file servers (on which the local agents execute) corresponding to particular segments. In one exemplary embodiment, the file server is identified by its IP address. More generally, file servers may be organized in groups, in a hierarchy, or in some other logical topology and the lookup may require communication over the network with a group leader or a node in a hierarchy. For efficiency, such information may be cached on a leased basis with registration for notification on changes to maintain coherency. The local file operation(s) 226 and peripheral storage operation(s) 228 at the determined file server can then determine the file to which an operation pertains. Once the request has been satisfied at the determined file server, the result is sent back to the original (portal) server (which may be the same as the determined file server). The original (portal) server may then return the result to the requesting client.

In one exemplary embodiment of the present invention, each (globally) unique FID (e.g., Inode) resides in a segment referred to as the "controlling segment" for that FID (e.g., Inode). As is understood in the art, an Inode is associated with each file and encloses key information about the file (e.g., owner, permissions, length, type, access and modification times, location on disk, link count, etc.), but not the actual data. In the exemplary embodiment of the present invention, the data associated with an Inode may actually reside on another segment (i.e., outside the controlling segment of the Inode). However, the controlling segment of a particular Inode, and the segment(s) containing the data associated with the particular Inode, will be addressable and accessible by the controlling file server. A group of segments that is addressable and accessible by a given file server are referred to as a "maximal segment group". Thus, the Inode and its associated data (e.g., the contents of the file) are contained within a maximal segment group.

At any given time, a segment is under the control of at most one local agent (i.e., residing on the local file server). That agent is responsible for carrying out file system operations for any FID controlled by that segment. The controlling segment's unique identifier ("SID") for each FID is computable from the FID by the translator using information available locally (e.g., in the superblock 330). In the foregoing exemplary embodiment, the controlling SID may be computed simply via integer division of the FID by a system constant, which implies a fixed maximum number of files controlled per segment. Other algorithms may be used.

Data from a file may be contained in a segment in the maximal segment group which is not under the control of the file server responsible for the controlling segment. In this case, adding space to or deleting space from the file in that segment may be coordinated with the file server responsible for it. No coordination is necessary for simple read accesses to the blocks of the file.

Client (user) entry and access to the entire file system may thus occur through any unit that has translation and routing operations, and that has access to a segment location map. Such units may be referred to as "portals." Multiple simultaneous access points into the system are a normal configuration of the file system. Note that a portal unit will not need a file system call translator operation(s) 232, assuming that such operations are provided on the client (end user) machines. However, such a configuration will require software installation and maintenance on a potentially large number of machines.

§4.3.2 Exemplary Methods

Exemplary methods that may be used to effect some of the operations introduced in §4.3.2 above, are now described.

Figure 5:
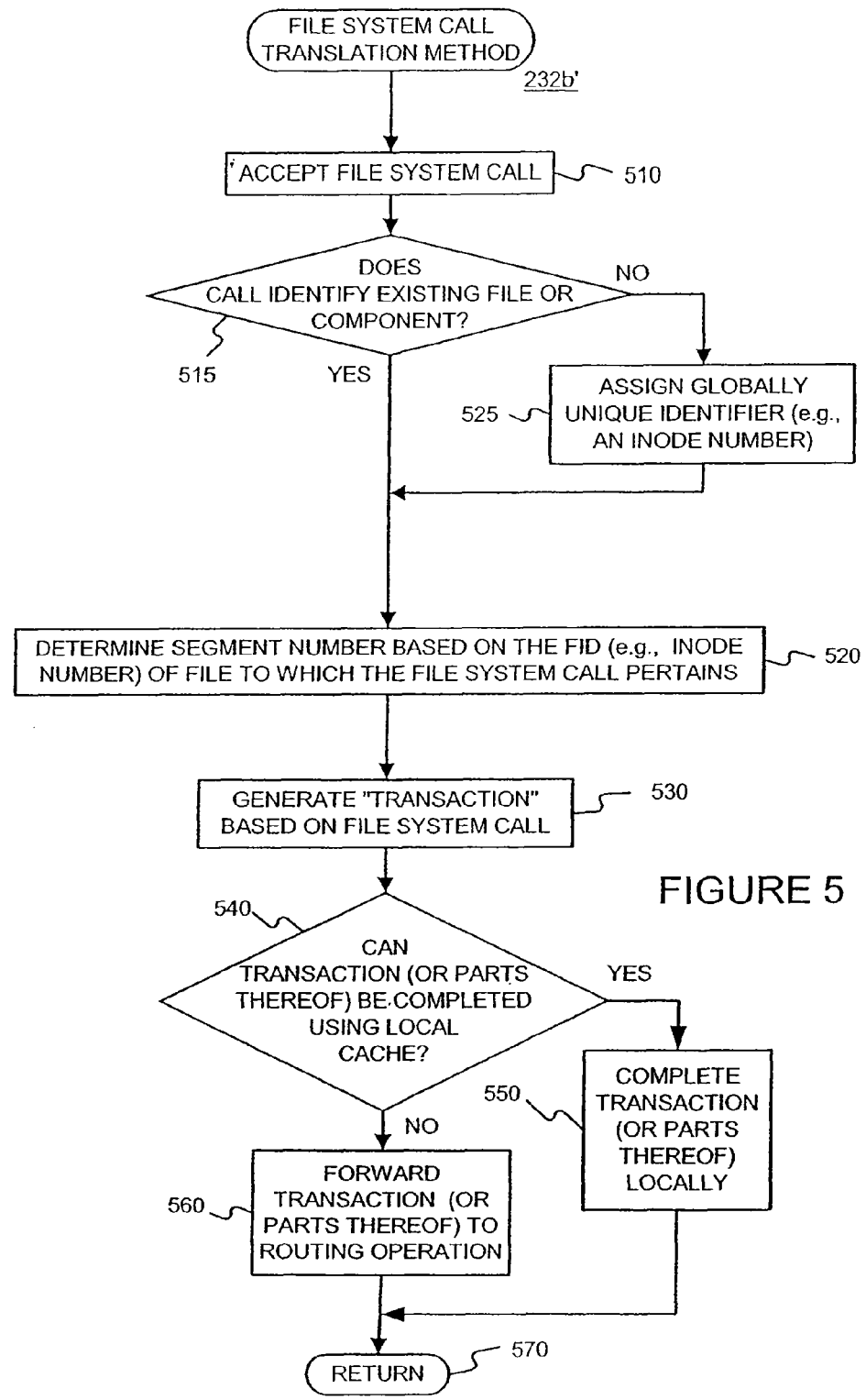
FIG. 5 is a flow diagram of an exemplary method that may be used to effect a file system call translation operation.

FIG. 5 is a flow diagram of an exemplary method 232b' that may be used to effect a file system call translation operation 232b. A file system call is accepted, as indicated by block 510. It is assumed that the file system call includes some type of globally unique file identifier ("FID"), such as an Inode number for example. Note that such a globally unique identifier will typically not be included when a file (or other component such as a directory or folder) is first provided (e.g., written) to the file system. As shown by conditional branch point 515 and block 525, if this is the case, a globally unique identifier (e.g., an Inode number) is assigned. Such assignment may be based on policies and/or global file system state information. Next, as shown in block 520, the relevant segment number is determined based on the unique FID (e.g., Inode number) of the file to which file system call pertains. Recall that this may be done by dividing an Inode number by some fixed number (and truncating to the next lower whole number if a remainder exists) in one embodiment. Then, a file system transaction is generated based on the file system call, as indicated by block 530. That is, a file system call from a client may have a particular format or syntax. If necessary, information from this file system call is simply reformatted into the appropriate syntax used in the distributed file system. This syntax may be a transaction object containing one or more so-called atomic file operation commands.

At conditional branch point 540, it is determined whether or not the transaction (or parts thereof) can be completed using the local cache (assuming that such a local cache is provided). If so, the transaction (or parts thereof) is completed locally, as indicated by block 550, and the method 232b' is left via RETURN node 570. Otherwise, the transaction (or parts thereof) is forwarded to a routing operation as indicated by block 560, and the method 232b' is left via RETURN node 570.

Figure 6:
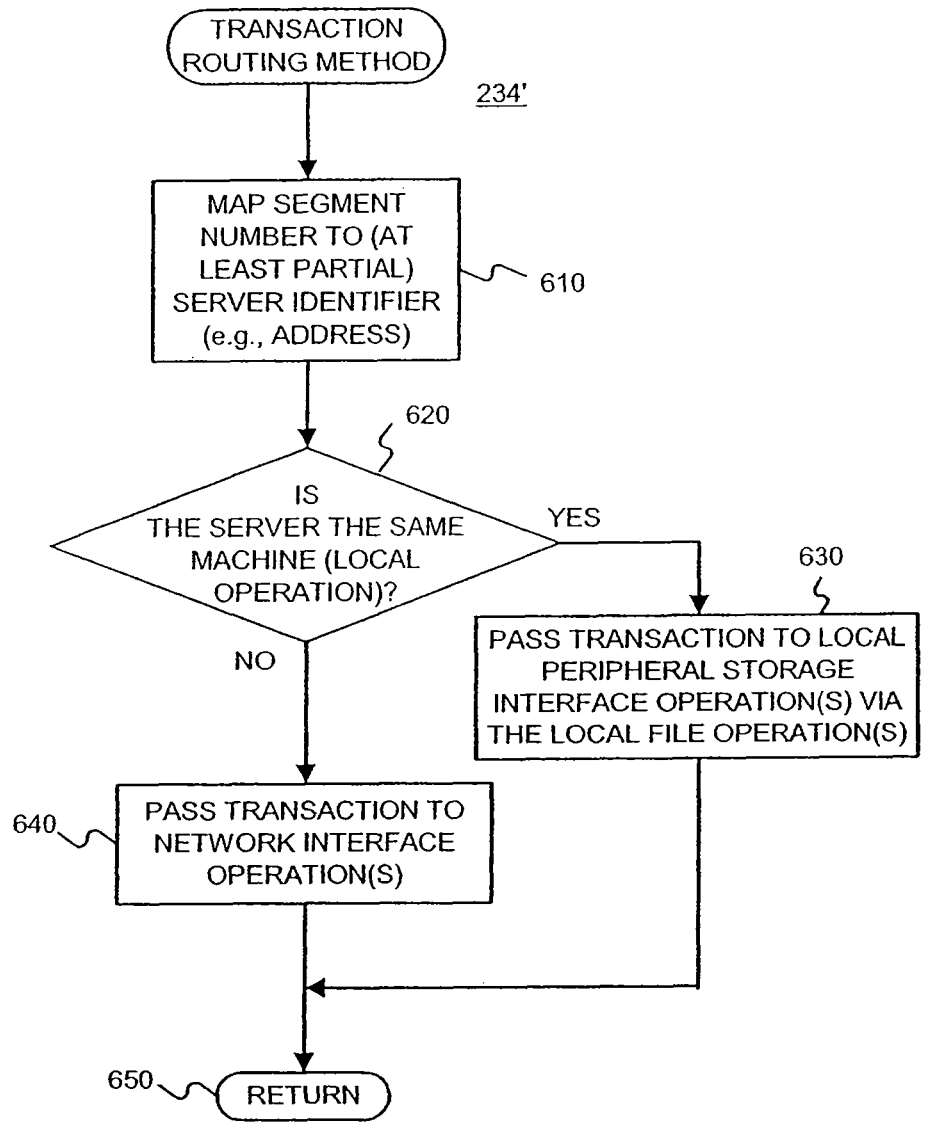
FIG. 6 is a flow diagram of an exemplary method that may be used to effect a transaction routing operation.

FIG. 6 is a flow diagram of an exemplary method 234' that may be used to effect a transaction routing operation 234. As indicated by block 610, the segment number is used to determine (e.g., mapped to) a server identifier or address (or at least to another machine that can map the segment to a server identifier or address). The server identifier or address may be an Internet protocol ("IP") address. For example, in the exemplary data structure 235' of FIG. 4 if the segment number (or a part thereof not masked out by a mask 414) matches a stored segment number 422, or falls within a range of segment numbers 412, the appropriate file server location, or partial file server location, 416 can be determined. Such a table may be manually or automatically populated (e.g., using file system administration 240) in a variety of ways, many of which will be apparent to those skilled in the art. For example, segment number-file server (address) associations can be manually tracked, and provisioned manually, by some global (i.e., file system wide) administrative authority. Each portal could then be manually configured using information from the administrative authority. On the other end of the spectrum, some automated signaling and network state distribution protocols, such as those commonly used by routers for example, may be used to collect file server information, provision segment numbers to that file server, and distribute segment number-file server associations to all portal units.

Referring back to FIG. 6, at conditional branch point 620, it is determined whether or not the portal/server is the same file server as that identified. That is, whether or not the transaction is to be performed locally is determined. This can only be the case when portal and file server functionality is provided on a machine with a single address for such purposes. (Recall, e.g., the file server and portal 250 of FIG. 2.) If so, the transaction is passed to the local peripheral storage interface operation(s) via the local file operation(s), as indicated by block 630. (Recall, e.g., operations 226b and 228b of FIG. 2.) The method 234' is then left via RETURN node 650.

Referring back to conditional branch point 620, if it is determined that the file server identified differs from the portal machine, the transaction is passed to network interface operation(s) 640, before the method 234' is left via RETURN node 650.

Figure 7:
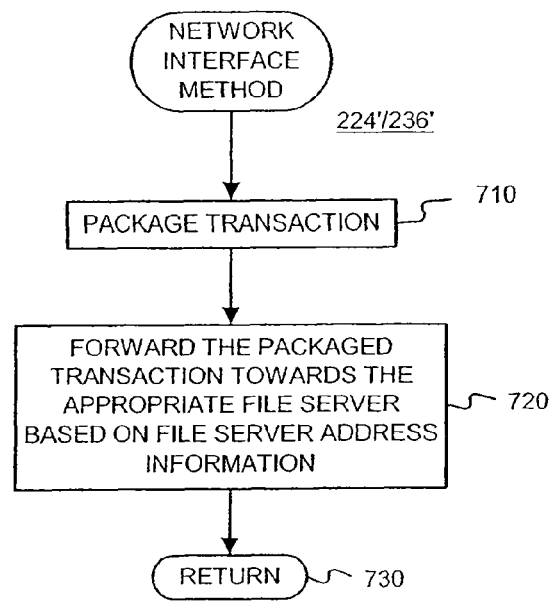
FIG. 7 is a flow diagram of an exemplary method that may be used to effect a network interface operation.

FIG. 7 is a flow diagram of an exemplary method 236' that may be used to effect a network interface operation 236. Upon receipt of a transaction, the transaction is "packaged" for forwarding towards the appropriate file server, as indicated by block 710. For example, if the appropriate file server has an IP address, the transaction may be carried as data in an IP packet. The packaged transaction is then forwarded towards the appropriate file server based on the file server address information, as indicated by block 720. The method 236' may then be left via RETURN node 730. A complementary method 224', not shown, can be used to unpackage a transaction (and save the address of the portal server) when it reaches the appropriate file server.

Figure 8:
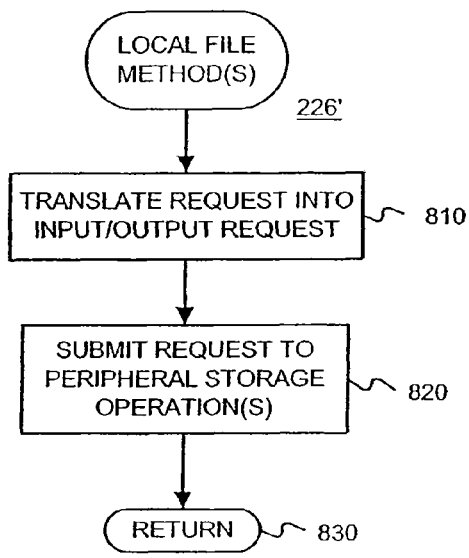
FIG. 8 is a flow diagram of an exemplary method that may be used to effect local file operations.

FIG. 8 is a flow diagram of an exemplary method 226' that may be used to effect local file operations 226. First, as indicated by block 810, the request is translated into input/output requests. These requests are then submitted to the peripheral storage operation(s) 820. The method 226' is then left via RETURN node 830.

Having described various exemplary methods that may be used to effect various operations, exemplary apparatus for effecting at least some of such operations are described in §4.3.3 below.

§4.3.3 Exemplary Apparatus

Figure 9:
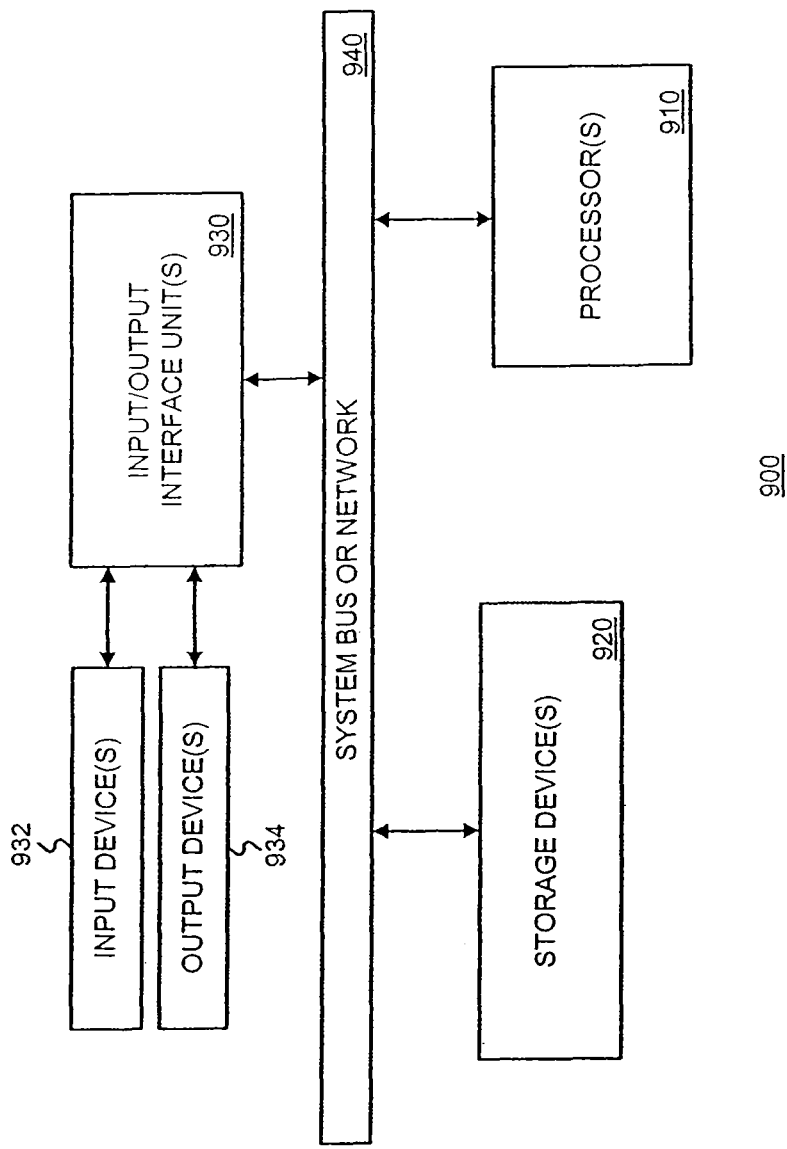
FIG. 9 is a block diagram of apparatus on which various operations of the present invention may be effected, and on which various data structures and files may be stored.

FIG. 9 is high-level block diagram of a machine (e.g., a computer, a personal computer, a hand-held computer, a network server, etc.) 900 that may effect one or more of the operations discussed above. The machine 900 basically includes a processor(s) (e.g., microprocessors, ASICs, etc.) 910, an input/output interface unit(s) 930, a storage device(s) (e.g., RAM, ROM, disk-based storage, etc.) 920, and a system bus or network 940 for facilitating the communication of information among the coupled elements. An input device(s) 932 and an output device(s) 934 may be coupled with the input/output interface(s) 930.

The processor(s) 910 may execute machine-executable instructions to effect one or more aspects of the present invention. At least a portion of the machine executable instructions may be stored (temporarily or more permanently) on the storage device(s) 920 and/or may be received from an external source via an input interface unit 930.

§4.4 Examples of Operations of Exemplary Embodiment

In an exemplary embodiment of the present invention, every basic file system function, whether client-oriented (e.g., read, write, etc.) or system-oriented (e.g., format disk, create file system, de-fragment disk, etc.) is viewed as a simple transaction object containing (atomic file operation) command substructures with slots for input parameters and results. The thread, which generates the transaction, will know how to set or read these input/output slots.

In the exemplary embodiment, each transaction type can be thought of as having two functions associated with it—a processing function and a packaging function. The processing function has two modes—a query mode and a normal mode. In the query mode, the function simply provides the caller (the main thread) with the file system and controlling Inode number of a specific transaction to be used to determine where the transaction must be processed. In the normal mode, the function performs whatever work is necessary to satisfy the file-system function. The packaging function handles packaging or un-packaging the input or output data of the transaction for transport between (portal and file server) hosts.

In addition, in the exemplary embodiment, each transaction has function-specific state variables used by the processing function. Each processing function is written to carefully track progress in executing the file system request so that at any point it may pass control over the transaction object to another process while awaiting a required resource, and then resume execution where it stopped when the resource becomes available. In effect, then, transactions are implemented as atomic file operations. These atomic file operations "block" individually, so that the threads themselves never have to.

To better understand how to read or write pages on disk (or some other storage medium), examples of operations of an exemplary embodiment of the present invention is now described. More specifically, an example of a file read is described in §4.4.1 with reference to FIG. 10. Then, an example of a file write is described in §4.4.2 with reference to FIG. 11.

In both cases, it must be understood that whenever a transaction needs to wait for a resource, such as a file for example (e.g., because it needs to be read from the disk, or because another transaction has it locked), the transaction may be queued while it waits for the resource to become available. In one embodiment, within the transaction (processing routine) itself, a transaction pointer is set to NULL. Whether or not the transaction pointer is valid (not NULL and with no error code) may be checked constantly. In addition, state variables within the transaction command structure may be maintained so that when the resource becomes available and the transaction is placed back into the execution queue, the transaction starts at the appropriate place (e.g., at the appropriate atomic file operation).

The following description follows the logic in the following code fragment. The command pointer is a pointer to some typical transaction structure (referred to as an Ibrix transaction structure without loss of generality) with the following members (perhaps among others). Assume that all members have been initialized to zero or NULL.

```
Typical_Cmd {
/* Inputs */
File_System *fs;       /* Current file system */
int         iseg;      /* Segment of sought block */
int         address;   /* Address of sought block */
/* Workspace variables */
Cpage       *page;
int         have_lock;
};
#define NORMAL_PAGE 0
```

In each of the following examples provided in §§4.4.1 and 4.4.2, it is assumed that the relevant file (e.g., the relevant Inode and the data associated with the relevant Inode) is stored on, or is to be stored on, a (filer server) unit other than the (portal) unit receiving the file call.

§4.4.1 Example of a Read Operation

FIG. 10 illustrates communications between operations in an exemplary sequence for executing a file system read request. A client (user) process (not shown) issues a file system call 1005 which is accepted by the file system call translation operation(s) (e.g., thread) 232. It 232 translates the clients file system call to a file system call having a transaction object-command syntax. More specifically, the request enters a file system call translation operation(s) (e.g., thread) 232. The operation(s) 232 allocates a transaction structure, fills in the operating system specific command substructure with the input parameters, and forwards the transaction to the transaction routing operation(s) 234 (e.g., places the transaction in the transaction router operation(s) thread input queue) as indicated by communication 1010.

The transaction routing operation(s) (e.g., thread) 234 calls the appropriate processing routine in query mode, obtaining the controlling Inode number of the request and the file system. It 234 computes the segment on which the controlling Inode resides. Then as indicated by communications 1015 and 1020, using the segment number, and the segment to file server address map 235, it 234 determines a server address. As stated above, in this example, the file server is remote. Since the segment is determined to be on another (file server) unit, the transaction routing operation(s) (e.g., thread) 234 marks the destination in the transaction and forwards the transaction to the network interface operation(s) 236 (e.g., puts the transaction on the input queue of the network interface operation(s) thread) as indicated by communication 1025.

The network interface operation(s) (e.g., thread) 236 calls the packaging routine on the transaction and forwards the packaged transaction to the appropriate (file server) unit as indicated by communication 1030. At the appropriate (file server) unit, the network interface operation(s) (e.g., thread) 224 calls the packaging routine to un-package the transaction and passes the transaction on to its local file system operation(s) (e.g., thread) 226 as indicated by communication 1035.

When the local file system operation(s) (e.g., thread) 226 determines that a read transaction is to be processed on the current machine, possibly after it has received the read transaction from another machine via the network interface operation(s) (e.g., thread) 224, it 226 then uses the normal mode processing routine to satisfy the file system function. This may actually involve multiple cycles through the processing function as the read transaction must typically wait for various resources to come available at different points in the function. (See, e.g., communications 1040 and 1045). As described below, the read transaction, performed at the local file operation(s) 226, may include pin, lock, and read&release commands.

The following illustrates three stages of an exemplary read operation:

```
Xaction *typical_read (Xaction *xact, Inum *inum) {
    ...
    /* 1. Pin the page */
    if (X_VALID(xact)) {
        Segment *segment = cmd->fs->segments[cmd->iseg];
        int n_pages = 1;
        cmd->page = pin_or_load_pages(&xact, cmd->address,
                                       NORMAL_PAGE, n_pages,
                                       segment);
        /* NOTE: xact may now be NULL! */
    }
    /* 2. Lock for reading */
    if (X_VALID(xact) && cmd->have_lock == 0) {
        if (set_read_lock(cmd->page, PAGE_INDEX(cmd->address),
                          &xact)) {
            cmd->have_lock = 1;
        }
        /* NOTE: xact may be NULL here! Note that in version
         * 1.0, set_read_lock takes a pointer to the xact,
         * not its address. In that case, we must have an
         * else clause which explicitly sets xact to NULL
         */
    }
    /* 3. Read & release */
    if (X_VALID(xact)) {
        char *buf =
        cmd->page->pages[PAGE_INDEX(cmd->address)];
        .../* Read the buffer */
        unset_read_lock(cmd->page, PAGE_INDEX(cmd->address));
        unpin_cache_page(cmd->page,
        PAGE_INDEX(cmd->address));
        xact->info |= IB_DONE;
    }
    return xact;
}
```

The first stage of the read command, indicated by:
/* 1 Pin the page */
loads the page into the cache from the disk and pins it for use. This first stage is quite simple, but it is also the most frequent type of action to take in any transaction in the file system of the present invention. Whether a page is to be read or modified, the system must first get it. A routine checks whether the page already exists in the local cache. If so, it attempts to pin it on behalf of the calling transaction. If the page is not available from the local cache, the routine generates a request to load the page to the disk and places the request on the input queue of a peripheral storage interface operation(s) thread. The transaction pointer is also recorded in the load request so that the thread may place it in the wait queue of the page once it has created it. Once recorded, the pointer is set to NULL. Note that the pointer may also become NULL if the page existed in the local cache, but the pin failed. These two events cannot be distinguished from the calling process.

Assuming that the first time through, the page was not available in the local cache, the transaction will be placed back in the local file system operation(s) thread queue once the page has been loaded. Note that the same instructions as before will be re-executed, but this time they will succeed.

In the second stage of the read command, indicated by:

/* 2. Lock for reading */ the page is locked so that the contents can be read without any danger of another thread modifying the page during such a read. The function that sets the lock performs in the same manner as the pin function.

An additional state variable (cmd->have_lock) is introduced. This state variable is not absolutely necessary in the example routine as written here, since there are no subsequent places in the routine where the transaction will have to wait on a queue. However, in general, it may be necessary to introduce some state variable to ensure that the same lock is not retried on a subsequent entry into the routine on the same transaction.

Once the page is locked by the transaction, in a third stage of the read command, indicated by:

/* 3. Read & release */ the page is read. Once done with the read, the transaction will release the lock and unpin the page. Note that, if further use of the same page is anticipated, the transaction might unset the read lock, but not unpin. It is then important to ensure that when the transaction is done, it will then unpin the page.

Once done (See, e.g., communications 1050 and 1055), the read transaction (i.e., the file, etc.) is passed back to its source. The read transaction may go directly to the file system call translation operation(s) (e.g., thread) 232, and thence to the client (user) that made the original file system call. Alternatively, the transaction may pass through the network interface operations (e.g., threads) 224 and 246 to be passed back to the original (portal) unit, and thence to the file system call translation operation(s) (e.g., thread) 232 there (as indicated by communications 1060, 1065 and 1070), and then to the client (user) that made the original file system call.

§4.4.2 Example of a Write Operation

FIG. 11 illustrates communications between operations in an exemplary sequence for executing a file system write request. A client (user) process (not shown) issues a file system call 1105 which is accepted by the file system call translation operation(s) (e.g., thread) 232. It 232 translates the clients file system call to a file system call having a transaction object-command syntax. More specifically, the request enters a file system call translation operation(s) (e.g., thread) 232. The operation(s) 232 allocates a transaction structure, fills in the operating system specific command substructure with the input parameters, and forwards the transaction to the transaction routing operation(s) 234 (e.g., places the transaction in the transaction router operation(s) thread input queue) as indicated by communication 1110. If the file hasn't yet been written to the file system, the file system call translation operation(s) 232 may assign a globally unique file identifier (FID) (e.g., an Inode number). Such FID (Inode number) assignment may be based on policies and/or a global state of the file system.

The transaction routing operation(s) (e.g., thread) 234 calls the appropriate processing routine in query mode, obtaining the controlling Inode number of the request and the file system. It 234 computes the segment on which the controlling Inode is to reside. Then as indicated by communications 1115 and 1120, using the segment number, and the segment to file server address map 235, it 234 determines a server address. As stated above, in this example, the file server is remote. Since the segment is determined to be on another (file server) unit, the transaction routing operation(s) (e.g., thread) 234 marks the destination in the transaction and forwards the transaction to the network interface operation(s) 236 (e.g., puts the transaction on the input queue of the network interface operation(s) thread) as indicated by communication 1125.

The network interface operation(s) (e.g., thread) 236 calls the packaging routine on the transaction and forwards the packaged transaction to the appropriate (file server) unit as indicated by communication 1130. At the appropriate (file server) unit, the network interface operation(s) (e.g., thread) 224 calls the packaging routine to un-package the transaction and passes the transaction on to its local file system operation(s) (e.g., thread) 226 as indicated by communication 1135.

When the local file system operation(s) (e.g., thread) 226 determines that a write transaction is to be processed on the current machine, possibly after it has received the write transaction from another machine via the network interface operation(s) (e.g., thread) 224, it 226 then uses the normal mode processing routine to satisfy the file system function. This may actually involve multiple cycles through the processing function as the read transaction must typically wait for various resources to come available at different points in the function. (See, e.g., communications 1140 and 1145). As described below, the write transaction, performed at the local file operation(s) 226, may include pin, lock, and write&dirty commands.

The first two stages of modifying an existing disk block (as opposed to allocating a new block to write to) are essentially identical to the first two stages of the read transaction described in §4.4.1 above, except that the lock request is set_write_lock rather than set_read_lock. Only the code beginning at stage 3 is shown.

```
Xaction *typical_write (Xaction *xact, Inum *inum) {
    ...
    /* 1. Pin the page - as in read */
    /* 2. Lock for writing - analogous to read */
    /* 3. Write & dirty */
    if (X_VALID(xact) && cmd->did_write == 0) {
        char *buf = cmd->page->pages[PAGE_INDEX(cmd-
>address)];
        ... /* Make changes to the buffer */
        unset_write_lock(cmd->page, PAGE_INDEX(cmd-
>address),
            (IBC_PAGE_DIRTY|IBC_PAGE_LOCK_FLUSH));
        cmd->did_write = 1;
        wait_on_page_queue(cmd->page, &xact);
        /* NOTE: xact is now NULL! */
    }
    if (X_VALID(xact) && cmd->did_write) {
        int iw = PAGE_INDEX(cmd->address);
```

```
        if (cmd->page->info[iw] & IBC_PAGE_READY) {
            /* We are DONE! */
            unset_flush_lock(cmd->page, iw);
            unpin_cache_page(cmd->page, iw);
            xact->info |= IB_DONE;
        }
        else {
            wait_on_page_queue(cmd->page, &xact);
        }
    }
    return xact;
}
```

The difference from reading occurs at the point when the transaction unlocks the page. Unlike reading, writing changes the contents of the page. Thus, when the transaction unlocks the page, the cache is informed that the transaction modified the page. This may be done by passing the IBC_PAGE_DIRTY flag. Setting this flag on the page will cause it to be placed in the dirty-page queue to be written to disk the next time the cache thread executes.

If it is desired to confirm that a write of the new data has actually occurred, along with the IBC_PAGE_DIRTY flag, the transaction may also set a flush lock. (See, e.g., communications 1160, 1165 and 1170.) Typically, the page cannot actually be written until the transaction exits and the cache thread executes, so transaction explicitly places itself on the page wait queue.

Once the write has occurred, the transaction will be placed back on the local file system operation(s) thread's input queue and it will reenter this routine. The transaction can verify that it is indeed here because the write completed (by checking the PAGE_READY flag). If not, the transaction can re-insert itself on the page queue. If so, the transaction can unset the flush lock, unpin the page and exit.

Note that if verifying the write is not necessary or not desired, then in the third stage of the transaction could have done the following:

```
        /* 3. Write & dirty */
        if (X_VALID(xact) && cmd->did_write == 0) {
            char *buf = cmd->page->pages[PAGE_INDEX(cmd->address)];
            ... /* Make changes to the buffer */
            unset_write_lock(cmd->page, PAGE_INDEX(cmd->address),
                                       IBC_PAGE_DIRTY);
            unpin_cache_page(cmd->page, PAGE_INDEX(cmd->address));
            xact->info |= IB_DONE;
        }
```

As before, the cache will process the write, but it is not confirmed.

In one exemplary embodiment of the present invention, the maximum length of a file name is 8191 characters (i.e., one file system block). Within the directory structure itself, however, only 42 (constant MAX_FAST_NAME_SIZE) characters may be recorded. If the name exceeds this size, it is replaced by a 16-byte number computed by a message digest algorithm (the MD5 algorithm, See, e.g., RFC 1321 which is incorporated herein by reference) for lookup/comparison purposes, plus a pointer to a block containing the name itself.

§4.5 Conclusions

As can be appreciated from the foregoing, the present invention teaches a file system that can span a disparate mix of heterogeneous units such as portals, files servers, and combinations thereof. These units are connected over one or more networks network and are managed and administered on a global basis. Consequently, the a system implemented in accordance with the present invention allows the transparent addition of any resources into the overall system without the need for planning or downtime.

As far as a client (user) is concerned, the entire file system resides on a portal unit. As long as the protocols used by the client employ file-locking procedures, any or all servers participating in a file system of the present invention may act as portal machines.

The Inode mapping convention allows a distributed file system to be realized.

What is claimed is:

1. A data storage system configured to implement a distributed, segmented single file system including the file system entities residing in segments and comprising at least portions of one of files and directories, the data storage system comprising:
    storage configured to store file system entities and metadata of the file system entities; and
    a first file server coupled to at least a first portion of the storage comprising a first segment of the single file system, the first file server controlling metadata of file system entities stored in the first segment;
    a second file server coupled to the first file server and at least a second portion of the storage comprising a second segment of the single file system, the second file server controlling metadata associated with file system entities stored in the second segment; and
    a portal coupled to the first file server and the second file server;
    wherein the first file server is configured to process a first incoming request for access to a first file system entity and to determine that first metadata of the first file system entity resides in a segment controlled by the second file server;
    wherein the second file server is configured to process a second incoming request for access to a second file system entity and to determine that second metadata of the second file system entity resides in a segment controlled by the first file server; and
    wherein the portal is configured to process a third incoming request for access to a third file system entity and to determine that third metadata of the third file system entity resides in a segment controlled by one of the first file server and the second file server.

2. The data storage system of claim 1 wherein the portal is further configured to determine the segment of the single file system in which the third file system entity resides.

3. The data storage system of claim 2 wherein the portal is configured to determine the segment in which the third file system entity resides by using an identifier contained in the third incoming request that identifies the third file system entity.

4. The data storage system of claim 3 wherein the portal is configured to apply the identifier to an algorithm that uniquely associates identifiers and segments.

5. The data storage system of claim 4 wherein applying the identifier to the algorithm comprises interpreting the identifier as a binary number and using a subset of binary digits in the identifier to determine the segment.

6. The data storage system of claim 1 wherein the portal is configured to determine the file server controlling metadata of the third file system entity by using an identifier that is contained in the third incoming request and that identifies the third file system entity.

7. The data storage system of claim 6 wherein the portal is configured to apply the identifier to an algorithm that uniquely associates identifiers and file servers.

8. The data storage system of claim 7 wherein applying the identifier to the algorithm comprises dividing the identifier by a constant.

9. The data storage system of claim 8 wherein applying the identifier to the algorithm further comprises comparing a quotient of the dividing to an association of segment numbers and file servers.

10. The data storage system of claim 7 wherein applying the identifier to the algorithm comprises interpreting the identifier as a binary number and using a subset of binary digits in the identifier.

11. The data storage system of claim 7 wherein the portal is configured to determine from the identifier that the third file system entity is associated with the first file server using a table associating the file servers and indicia associated with the identifier.

12. The data storage system of claim 7 further comprising an administrator device coupled to the portal wherein the portal is further configured to modify the algorithm in accordance with at least one instruction received from the administrator device.

13. The data storage system of claim 1 wherein the first file server is configured to provide the second metadata to the portal and the portal is configured to directly access the second file system entity using the second metadata.

14. The data storage system of claim 1 wherein the portal is configured to determine at least one of the segment in which the third file system entity resides and the file server controlling metadata of the third file system entity by using an identifier, identifying the third file system entity, contained in the third incoming request wherein the identifier is an Inode number.

15. The data storage system of claim 1 wherein the second file server and the portal reside in a single physical device.

16. The data storage system of claim 1 wherein at least one of the first incoming request and the third incoming request includes an indication of a respective one of the first file server and the second file server.

17. The data storage system of claim 1 wherein the at least one of the first incoming request and the third incoming request includes a segment number and a subsequent number.

18. The data storage system of claim 17 wherein the subsequent number is in Inode number.

* * * * *